June 19, 1962 D. K. McLEAN 3,039,428
INTERNAL HOLIDAY INSPECTION AND PAINT SPRAY APPARATUS
Filed Oct. 3, 1960 4 Sheets-Sheet 4

Douglas K. McLean
INVENTOR.

BY Wm. E. Ford

ATTORNEY

United States Patent Office 3,039,428
Patented June 19, 1962

3,039,428
INTERNAL HOLIDAY INSPECTION AND PAINT
SPRAY APPARATUS
Douglas K. McLean, Dallas, Tex., assignor to Harvest
Queen Mill & Elevator Company, Dallas, Tex., a corporation of Texas
Filed Oct. 3, 1960, Ser. No. 61,050
14 Claims. (Cl. 118—8)

This invention relates to pipe protection apparatus for insuring that the internal surface of pipelines and conduits may be kept coated or protected by an insulative corrosion resistant material thereby to avoid corrosion and the resulting deleterious effects thereof. This application is a continuation-in-part application of co-pending application Serial No. 29,529 filed May 16, 1960, now abandoned.

In practice it is well known that due to various causes the coating on the interior surface of various pipelines and conduits may be found to be interrupted as the coating may have been originally applied, or thereafter in the course of further operations, usages, construction, maintenance, and repair.

The labor, materials, and product losses from pipelines amount to a greater and greater percentage of the economic investment of this nation and the problems of policing such pipelines to prevent the loss of the products transported therein become problems of ever-increasing importance each year. This is true in all cases where improperly or incompletely insulated pipe may corrode through electrolytic action set up at unprotected areas, and the resulting losses, especially in gas pipelines and in pipelines conveying expensive chemicals can be enormous. Additionally, it is well known that the maintenance of smooth and evenly coated internal pipe surface reduces performance losses due to turbulence.

The undesirable condition to be detected is an uncoated, unprotected, or unpainted area termed a "holiday." The invention thus sets out as its primary object to provide apparatus and equipment which can automatically detect holiday areas within pipe which should be completely internally coated, and upon detection, automatically completes the coating by spraying on the requisite paint or coating material.

The invention also has as its object the provision of such apparatus and equipment which is adapted to flush or clean out any paint remaining in the apparatus and equipment after the painting process.

It is also another object of this invention to provide apparatus and equipment of this class requiring human action only to draw the apparatus in its transit through the pipe being inspected.

As a particular object the invention provides apparatus to catch the solvent, purging, or flushing agent so that it does not contact the sprayed pipe.

Also as a special object the invention sets out to spray-coat pin holes, holidays, and/or bare spots on metal surfaces, particularly on the internal surfaces of pipelines sections that have been welded together, and the invention has application whether or not the pipeline has been lowered into a trench and covered, or whether the pipeline is simply in the trench and not covered, or whether it is left on top of the ground.

The invention also has the object of coating the areas of ends of joints of pipe that have been coated internally prior to welding wherein the welding process has caused the internal coating to burn off, char, peel or blister at the point where the weld is made.

Additionally the invention has the further object of covering the internal coating where the pipe has been damaged by the attachment of cathodic protection equipment.

It is also another object of the invention to coat weld-damaged areas to protect the metal from corrosion and to provide smoother surface to reduce turbulence and aerodynamic drag.

Also, as a further object the invention sets out to restore coating to metal surfaces where the original coating has cracked, peeled, or has been scraped off mechanically or removed by erosion, corrosion, or dissolution.

Other and further objects will be apparent when the specification herein is considered in connection with the drawings, in which:

FIG. 6 is an enlarged detail view of the latching relay mechanism shown in small scale in FIG. 3.

Figure 1:
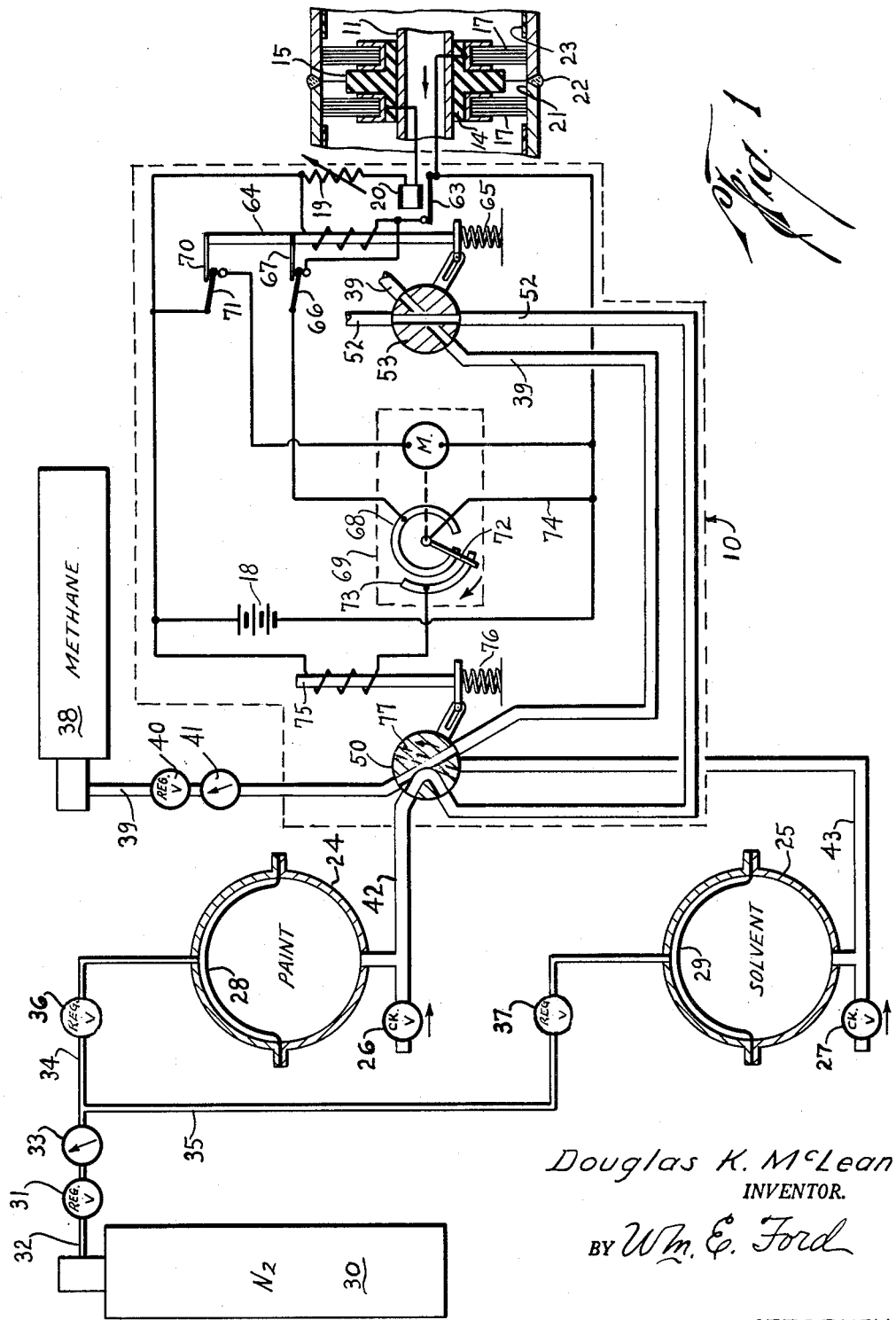
FIG. 1 is an electrical diagram and flow sheet showing the means by which the various functions of the invention are carried out.

Referring in detail to the drawings in which like reference numerals are assigned to like elements in the various views, a valve case or housing 10 is represented in dotted lines in FIG. 1, such being mounted on a frame shaft 11 which is to be moved through a pipe 12 as the apparatus carried by the shaft inspects for holidays or unpainted areas which should have been protectively painted or coated. The shaft 11 extends behind the housing 10 in direction opposite its direction of travel and has mounted thereon an insulative sleeve 14 of material such as rubber and the like, the central part of such sleeve 14 comprising a radially outwardly extending spacer disc 15. On each side of the spacer disc 15 a metallic spool sleeve 16 is mounted on the insulative sleeve to receive therein the inner ends of wire bristles or brushes 17, such wire bristles being of length when installed to extend into frictional contact with the inner surface of the pipe.

A battery 18 is provided within the housing 10 and a low voltage circuit extends in parallel with the normal voltage circuit of the battery and includes a variable rheostat 19 having in series therewith a relay 20 with conductor therefrom extending through the shaft 11, and the nearest insulative support 14 to the nearest metallic spool sleeve 16 to establish electrical contact with the bristles 17 carried by such sleeve 16. The return or ground conductor of such low voltage circuit extends through the bristles carried by the farthest spool sleeve 16 through the insulative sleeve 14 to return through the shaft 11 to the ground side of the battery.

The paint employed to coat the inner surfaces of pipe to inhibit corrosion is of many types and characteristics but the type which has been employed with most considerable success has been found to be a paint having an epoxy resin base especially when a solvent such as methyl ethyl ketone is applied upon the paint as an affixing agent. Holidays usually occur at the ends of pipe sections where in the process of welding two sections together the previously applied protective paint adjacent thereto is knocked off or is melted by the heat generated during welding. In FIG. 1 a holiday area 21 is shown extending on either side of the weld 22 between two sections of pipe 12 and the coated pipe surface 23 terminating at a spaced distance from the weld. When the pipe detection apparatus is drawn through pipe coated with corrosion inhibitive, insulative paint, as a paint with an epoxy resin base, no circuit can be completed between the forward and rearward bristles 17, and the relay 20 remains de-energized. However, when bristles of both forward and rearward brushes can bear upon the metal of the pipe 12, as in a holiday area 21, the low voltage circuit is completed and the relay 20 is energized.

The energization of the relay 20 thus constitutes the impulse from the holiday detector which should set in motion the processes which are to spray paint on the holiday area which has been detected to serve as a permanent corrosion inhibitive and insulative coating upon the inner surface of the pipe. Also, as the paint in most cases must be inherently viscous, it is necessary on many occasions to provide an inert gas to atomize the paint to insure its forced and evenly spread delivery to the inner surface of the holiday area of the pipe. In next sequence, after the paint has been sprayed, it is necessary to flush the common conduit down to and including the spray head with solvent, as otherwise, because of the viscous and sticky nature of the paint, it will become deposited on the inner surface of the conduit and eventually cause complete stoppage.

As shown in FIG. 1, the paint and solvent are provided in spherical reservoirs 24 and 25, respectively, such liquids being forced by pumps through check valves 26 and 27 into the respective reservoirs when the valve downstream therefrom, to be hereinafter described, is closed. These reservoirs 24 and 25 have neoprene or similar substance diaphragms 28 and 29 thereacross which stretch in opposition to the pressure of a gas such as nitrogen exerted on the opposite sides of the diaphragms from the liquids within such reservoirs.

The paint employed can well be an epoxy resin, and polyvinyl chloride has been employed to provide the solid constituencies of the paint. Such solids are carried by a solvent, as methyl ethyl ketone, in the presence of a catalyst, as of the amine or amid type. As the solvent employed as a flushing agent thereafter, methyl ethyl ketone has served well in practice.

The pressurized gas which is employed to force the liquid paint and solvent from their respective reservoirs is shown provided in a nitrogen bottle or container 30 which has been filled under conditions to place the gas in the container under extreme pressures and considerably higher than the pressures to be overcome in forcing the liquid from the liquid reservoirs.

To reduce the pressurized gas to pressure within limits to force the liquids from their reservoirs at a desired delivery rate, a pressure regulation valve 31 is provided in the discharge line 32 from the nitrogen gas container 30 and also a gauge 33 is provided in such line upstream from the point where the line divides into two conduits 34 and 35 which convey the gas as required to the respective paint and solvent reservoirs 24, 25. Additional pressure regulation valves 36 and 37 may be provided as required in the respective conduits 34 and 35 whereby the pressure exerted by the nitrogen gas against the diaphragms 28 and 29 may be regulated to apply final adjustment as the required delivery pressures for delivering paint and for delivering solvent may vary.

A pressurized bottle or container 38 containing a gas, as methane, provides the pressurized gas for atomizing the paint delivered to the holiday surfaces of the pipe. A discharge conduit 39 conveys such highly pressurized methane to a valve to be hereinafter described, the conduit 39 having the pressure regulation valve 40 therein and a suitable gauge 41 for indicating the pressure.

Figure 2:
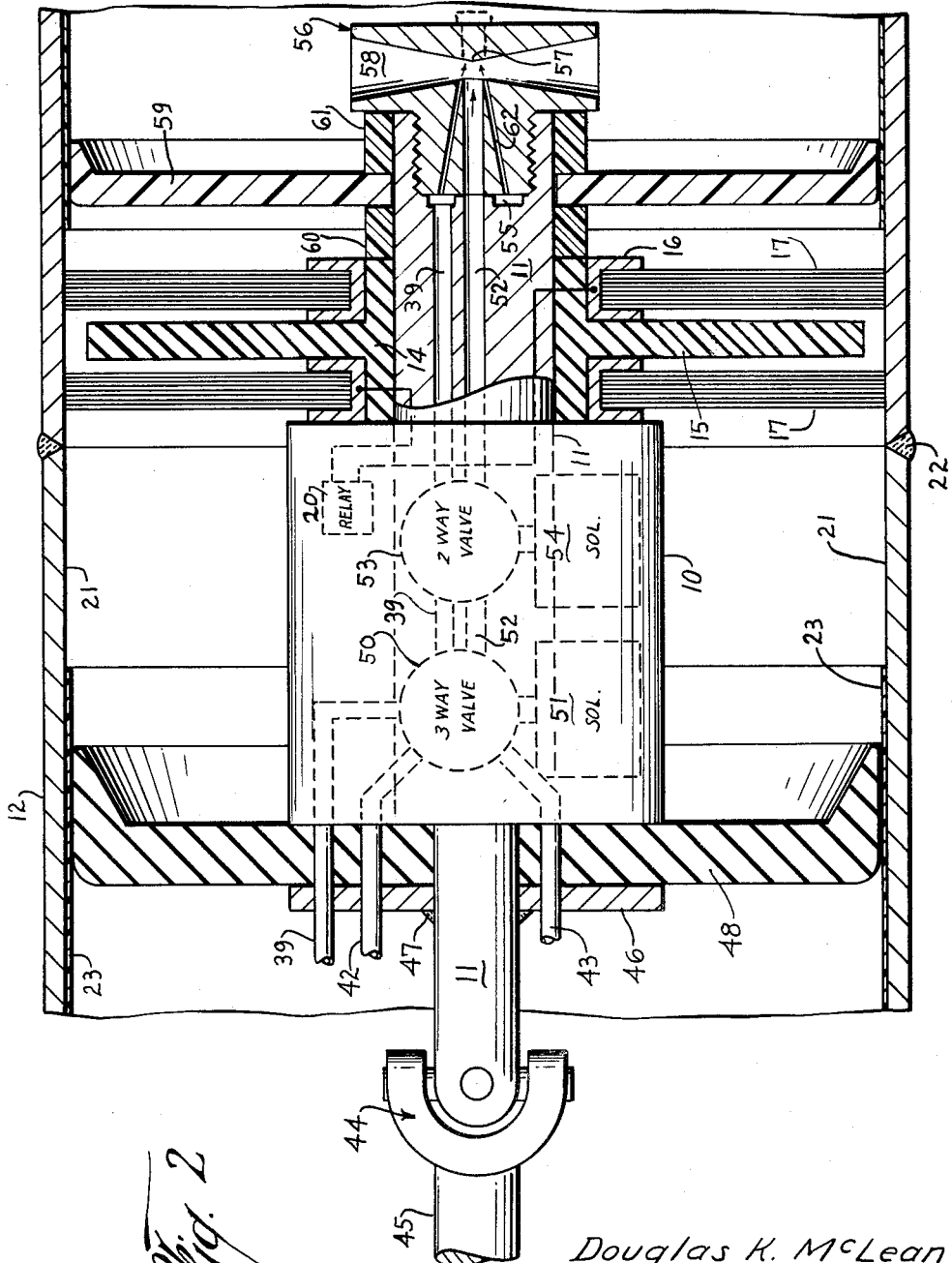
FIG. 2 is a view part in section and part diagrammatic showing the relationship of the structural elements of the invention.

Referring now to FIG. 2, the shaft 11 hereinabove described as having the brushes 17 mounted thereon, is shown as having a universal connection 44 as a forward element thereof to which is connected the means 45 such as a rod or a cable or a tubular stem, as may be desired, by means of which the apparatus 10 is drawn through the pipe 12 to be cleaned. In this regard the universal connection 44 provides that freedom of movement which insures that the apparatus may be drawn over any irregularities or curvatures in the pipe.

The methane conduit 39, the paint conduit 42, and the solvent conduit 43 are shown in FIG. 2 as extending rearwardly from the forward end of the pipe and through a plate 46 receiving the shaft 11 therethrough and welded to such shaft at 47. Such conduits also pass through a flexible cup 48 of material such as rubber and of shape corresponding to the well known Guiberson cup. Such cup is dimensioned to fit with pressure against the insulative paint 23 on the inner surface of the pipe 12 thereby to seal against the passage of any liquid or gas forwardly of such cup 48. As the cup is resilient or flexible, its diameter is also expandable to press sealably directly against the holiday surfaces of the pipe in the absence of the insulative paint.

The conduits 39, 42 and 43 extend through the base of the cup 48 and into a housing or valve case 10 which is rigidly connected to the inner face of the cup base as by machine screws not shown which extend inwardly through the plate 46 and cup 48 for connection to such housing or valve case 10.

Within the valve case 10, the conduits 39, 42 and 43 are shown in FIG. 2 to communicate with a three-way valve 50, such three-way valve being controlled by a solenoid 51, as will be hereinafter described. From the three-way valve 50 a conduit 52, which serves alternately as the conduit for paint and for solvent, is shown extending to a two-way valve 53, and also the atomizing gas conduit 39 is shown extending from the three-way valve 50 to the two-way valve 53, the two-way valve being shown as being controlled by a solenoid 54.

From the two-way valve 53 the conduit 52 extends axially through the shaft 11 and through the axis of the shank of a spray head 56 to direct the fluid conveyed thereby against a substantially inwardly extending cone point 57 on the axis of the apparatus and spray head. This conical point 57 thus serves as the point from which cone-shaped discharge nozzles or orifices 58 extend radially outwardly.

As it is well known in spray head construction, the diameters of the nozzles or orifices at their discharge outlets should bear such relation to the inner diameter of the pipe and to the force of delivery through the nozzles that the cones of delivery overlap each other in the area of delivery upon the inner surface of the pipe. For this reason a multiplicity of orifices will be required preferably equally spaced apart about the periphery of the spray head. However, for best purposes of illustration as shown in the spray head 56 in FIG. 2, only the two diametrically opposed nozzles or orifices are shown in order to give the least cluttered illustration of the factors involved. In reality, however, the view of the spray head 56 in FIG. 2 should show the inner openings of those other required orifices or nozzles which extend radially outwardly from the center of the spray head as intersected by the axis of the nozzles or orifices 58 which are shown.

From the two-way valve 53 the atomizing gas conduit 39 extends through the frame shaft 11 to communicate with an annular header space 55 at the base of the bored and threaded recess in the end of the shaft 11, which receives the discharge spray head shank threadably therein. From the annular header space 55 a plurality of flow ports 62 extend therefrom in direction to communicate with the center of the orifices and to direct the gas to impinge upon the cone point 57.

In order to prevent the arcing of the current between the wire brushes 17 from causing conflagration rearwardly of the brushes 17, a spark baffle 59 is provided of a noninflammable substance such as a substance comprising certain hard rubber material. Such spark baffle is shown spaced forwardly of the spray head nozzle and rearwardly of the wire brush support 14 by respective spacers 60 and 61.

It is necessary to deliver first paint and then solvent to the spray head over two successive time cycles, and it may be necessary to atomize at least the paint delivered during the first time cycle, and under certain conditions the solvent also may have to be atomized. Thus it is necessary to provide one downstream shut-off valve that stays open during both time cycles for the delivery first of paint and then of solvent therethrough and also for the delivery of an atomizing gas therethrough during at least the first time cycle. Upstream of this first valve a second valve must be provided to shift selectively from paint to solvent passage therethrough at the end of the first time cycle and to permit the passage of atomizing gas therethrough during either the first or both time cycles. Such valves must be operable automatically upon the closure of the low voltage circuit upon the occurrence of a holiday in the pipe.

The arrangement by which these occurrences are accomplished includes a circuit from the negative or ground side of the battery 18 having therein a normally open switch 63 which is closed by the energization of the relay 20 when its circuit closes upon the detection of a holiday in the pipeline. When this relay operated switch 63 closes it completes circuit through the windings of a solenoid 64 which is connected to open the valve 53 against the urging of its solenoid spring 65. This two-way valve, or double two-way valve 53, as shown in FIG. 1, places the portions of the conduits 39 and 52 upstream and downstream of the valve 53 in fluid communication.

As the energization of the relay 20 is of very short duration, since the paint immediately begins to cover the holiday and short out the low voltage circuit through the relay, it is necessary to provide means to maintain the solenoid windings 64 energized as the low voltage circuit is shorted out. This is accomplished by providing a circuit extending from a point between the solenoid windings 64 and the relay switch 63 to a normally open switch 66. This switch 66 is moved by a bar or projection 67 extending from the solenoid 64 to close such switch 66 when the solenoid 64 passes downwardly as its windings are energized. From the switch 66 this circuit, which insures that the solenoid windings 64 remain energized, extends to a bus bar or ring 68 on a timer 69 indicated as a dotted line rectangle in FIG. 1. This circuit and its continuation will be further described hereinbelow.

As it is also necessary to start the motor M of the timer 69 when the relay 20 is energized, a bar 70 provided on the solenoid 64 closes a normally open switch 71 in a circuit which extends across from the positive to the negative or ground side of the battery and includes the timer motor M therein. The mechanism of the timer motor then rotates the needle 72 of the timer to establish contact with the initial end of the timer ring 68, and also with the initial end of a timer arch 73 radially outwardly of the timer ring 68 but which extends in arc proportionate to the predetermined time cycle of the first interval as compared with the predetermined time cycle of a complete revolution of the timer needle. A circuit 74 parallel to the circuit through the switch 66 extends from the negative or ground side of the battery 18 to make electrical connection with the pivot point of the needle 72. From the arch or arcuate bus bar 73 circuit extends through the windings of a second solenoid 75 to the positive side of the battery 18.

When the solenoid 64 is energized and its bar 70 closes the normally open switch 71 the motor M begins running and moves the needle 72 from its initial position into contact with the arcuate bus bar 73 to energize the windings of the solenoid 75 which moves downwardly against the force of its spring 76 and shifts the three-way valve 50 to place the paint conduit 42 in communication with the common conduit 52 for paint and solvent which extends between the three-way valve 50 and the two-way valve 53.

Also this valve 50 places the methane gas conduit 39 upstream therefrom in communication with the portion of this conduit downstream thereof. Paint thus flows through the valve case 10 to the conduit 52 in the after end of the frame shaft 11 to the spray head 56 and atomizing gas also flows through the conduit 39 through the valve case 10 and on through such conduit 39 in the frame shaft 11 to the header 55 and to the atomizing flow ports 66 and onward therefrom to atomize the paint sprayed out through the nozzles or orifices 58.

This flow of paint and of atomizing gas continues until the needle 72 passes off of the arcuate bus bar 73 and circuit is broken through the windings of the solenoid 75 whereby its spring 76 returns it to upper position and shifts the valve 50 to place the solvent conduit 43 in communication with the common conduit 52 for paint or solvent. Solvent now flows in such common conduit. If the solvent which may be employed is of such viscosity that it may require atomization, the valve 50 may have provided therein another passage 77 crossing the first atomizing gas passage and so spaced therefrom that upon the upward shift of the solenoid 75 such port 77 establishes communication between the upstream and downstream portions of the conduit 39.

In the meantime, current continues through the conductor 74 by way of the needle 72 and ring bar 68 to the circuit of the switch 66 and from thence through the windings of the solenoid 64 to the positive side of the battery 18 and thus the solenoid 64 remains energized and the valve 53 remains open. It follows that since the solenoid 64 remains energized then the switch 71 remains closed, so that circuit through the motor M remains closed, the motor M continues to rotate the needle 72 during a second time cycle which begins when the needle passes off of the bar or arch 73 and terminates when the needle 72 passes off of the terminal end of the timer ring 68. When this occurs the circuit which includes the switch 66 is broken and thus circuit is broken through the windings of the solenoid 64 (it being assumed that circuit through the relay 20 has long since been broken). The solenoid 64 may now move upwardly to allow the normally open switch 66 to open and also to allow the normally open switch 71 to open thus to break circuit through the motor M whereby the needle 72 is no longer drivingly engaged thereby and can assume its initial position out of contact with both the ring 68 and the arch 73.

The means which returns the needle 72 to this initial position is not shown since in conventional timers as the timer 69 this operation of the needle, and the means returning it, are well known in the art. For instance, opposed springs on an extension of the needle on the opposite side of its pivot point from its pointer end may accomplish this return. With the valve 53 closed by the solenoid 64, all fluid communication is cut off and the device remains inoperative until it is drawn further through the pipe until it arrives at the location of a succeeding holiday.

It is well known that most paints, and especially a paint comprising epoxy resin solids which have been carried by a solvent such as methyl ethyl ketone in presence of a catalyst, such as amine or an amid, will be sticky and very viscous and will soon accumulate in any conduit or valve through which it passes to cause turbulence of flow and even to completely block further fluid flow. This possibility has to be avoided by the provision of a solvent or flushing agent which is sent through the conduits and valves through which the paint has passed right after its passage. In cases where a paint can be used that does not tend to stick in the flow passages it transits, no necessity will exist for a solvent or flushing agent, and thus no necessity will exist for a three-way valve to alternate in turning on first paint and then solvent so that solvent must stand in the line down to the last valve before outlet discharge.

When a paint not requiring flushing can be employed, then the arcuate bar 73, the solenoid 75, and the valve 50 will be unnecessary nor will be the solvent supply and solvent system. In such case only the valve 53 will be required which will turn on and off the paint and atomizing gas. Thus the timer will only need the timer ring 68 to control the length of time the paint will be sprayed.

Figure 3:
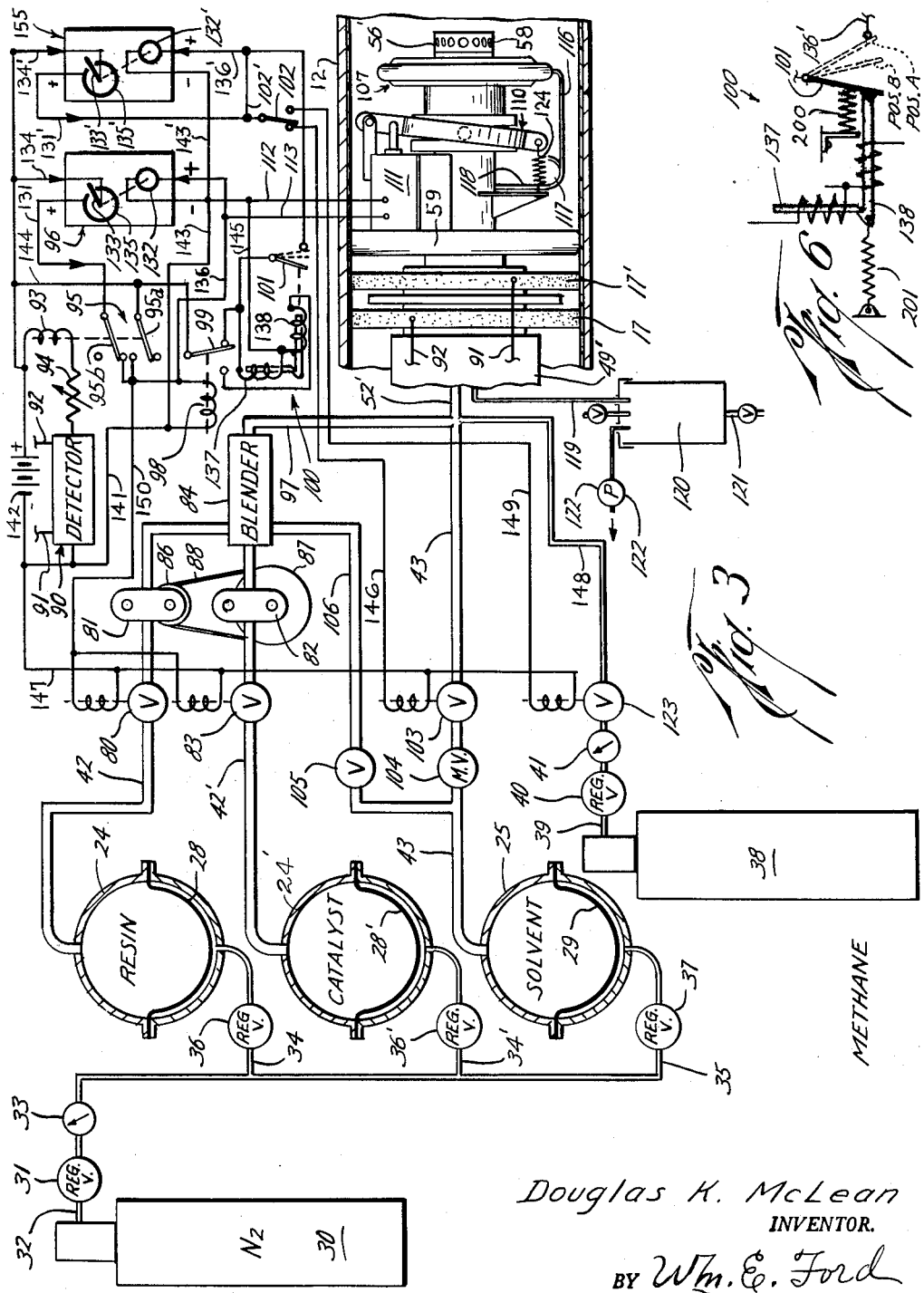
FIG. 3 is an electrical diagram and flow sheet of a preferred modification of the invention showing the means by which the various functions of the invention are carried out.
Figure 4:
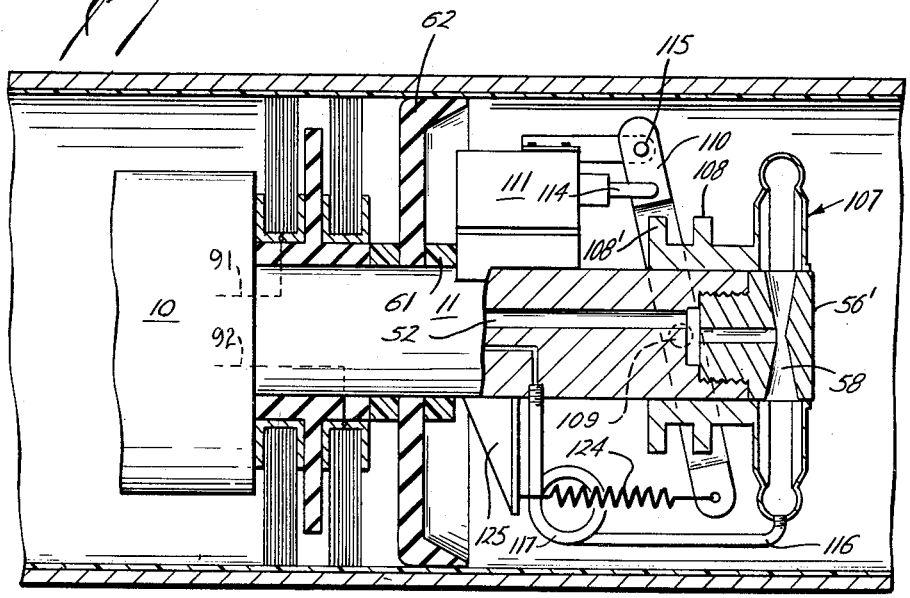
FIG. 4 is a sectional view showing a preferred form of detection, spray and purge apparatus.

In the preferred form of invention shown in FIGS. 3 and 4 reservoirs 24, 24', and 25 are provided, respectively for paint or epoxy resin, a catalyst, and solvent, such reservoirs have diaphragms 28, 28', and 29 thereacross respectively to urge the reservoir contents outwardly as in turn urged outwardly by nitrogen gas, which passes from the nitrogen reservoir 30 down the conduit 32 through a master regulator valve 31, a gauge 33, a side conduit 34 through regulator valve 36 into the reservoir 24 on the opposite side of the diaphragm 28 from the paint or resin. The pressurized nitrogen also passes through a side conduit 34' and regulator valve 36' to the opposite side of the diaphragm 28' from the catalyst. And also the nitrogen passes through a side conduit 35 through the regulator valve 37 to the opposite side of the diaphragm 29 from the solvent, flushing, or purging agent.

From the reservoir 24 the resin or paint passes through the conduit 42 through a solenoid operated valve 80 to a metering pump 81 positioned oppositely a metering pump 82 which meters the catalyst passed thereto down a conduit 42' and through a similar solenoid operated valve 83. The pumps are geared or driven to operate together to proportionately feed resins and their respective catalysts together into a blender 84 on a demand basis. This gearing is indicated diagrammatically by the small pulley 86 on the pump 81 and the large pulley 87 on the pump 82, and their pulley belt connection 88.

A detector 90 of any suitable type is provided and such may be a voltage break down system, and hereinabove described with reference to FIGS. 1 and 2, as designated by the conductors 91 and 92 from the spaced apart brushes 17, 17', the same conductors 91 and 92 being shown as establishing electrical connection to the detector 90. Optionally the detector 90 may be a circuit shorting system, a radiant energy scanning system or any other system for detecting the absence of a coating on a metal surface. When actuated, the detector 90, through a sensitivity control rheostat 94, energizes a relay 93 to close the switch 95a of a double-pole, double-throw relay switch 95. Thus a circuit is closed to conductor 150 to energize the solenoids of the respective valves 80 and 83 to admit paint and catalyst respectively to the pumps 81 and 82.

The paint and catalyst then flow into the blender 84, designed to mix them thoroughly, and therefrom they flow in admixture through a conduit 97 to a conduit 52' carried by a case 49' corresponding with the case 10 shown in FIGS. 1 and 2. From this point the paint is delivered to the spray head 56' and from thence it is sprayed onto the pipe surface which has actuated the detector 90 by having lesions or holidays therein, a spray head cover ordinarily covering the spray nozzles 58' of the spray head 56' first being automatically retracted as will be hereinbelow described.

The closing of the switch 95a by the detector also closes a circuit through a relay 98 and by way of a conductor 136 to the motor 132 of the paint timer 96, circuit therefrom to the negative side of the relay 98 being made by way of return conductor 143. When energized the relay 98 holds a switch 99 in the right hand position shown in FIG. 3 to complete a circuit through the windings of a latching armature 137 to maintain its windings energized to hold in latched position an actuating armature 138, as best shown in FIG. 6 such armature having operative contact with a switch 101 which closes contact to the purge timer circuit, as will be hereinafter described. From the windings of the latching armature 137 circuit is returned through a conductor 145 to the return conductors 143 and 141 to the negative side of the battery 142.

The motor 132 rotates the needle 133 onto the paint timer cam 135 to establish circuit from the positive conductor 134 from the line 140 through the axis of the rotating needle 133, by way of the paint timer cam 135 to the conductor 144 and the switch 95a, as actuated by the detector 90, to the negative side of the circuit by way of the conductor 150, the windings of the solenoid valves 80 and 83, to open these valves and the common return conductor 147, to the negative terminal of the battery 142. In this case the motor 132 continues to rotate the paint timer needle 133 upon the cam 135 even though the return conductor 131 from the negative side of the cam terminates at the open switch 95b. On the other hand, if the detector emits no signal, then the double pole, double throw switch 95 takes the position shown in FIG. 3, with the switch 95a open and the switch 95b closed, so that the return circuit from the paint timer circuit is a live circuit through the relay 98 back to the battery 142, and through the conductor 150 to operate the valves 80 and 83, and back to the battery.

When the paint timer needle 133 moves off of the paint timer cam 135, circuit is broken unless at that time the detector 90 may be energizing the relay 93 in which case circuit is completed as aforesaid by way of the conductor 144 and the switch 95a to keep the motor 132 running, in which case the motor again rotates the needle 133 onto the paint timer cam 135 for another cycle of rotation. When the paint timer needle 135 is finally moved off the cam 135 with the switch 95b closed, positive current theretofore supplied through the conductor 134 is broken, and the relay 98 is de-energized and the motor 132 is stopped, and the valves 80 and 83 are closed. Also the spray head nozzles 58' are covered as will be set forth in detail hereinbelow.

As the armature of the relay 98 is retracted to the left when circuit is broken through the relay windings the switch 99 may move to its normally closed position to the left to close circuit through the windings of the actuating armature 138 while breaking circuit through the windings of the latching armature 137 to permit this armature to retract upwardly from the latching position shown in FIGS. 3 and 6.

This permits the armature 138, as energized by its windings, to be forcefully urged to the right beyond its normally unlatched position B due to the overtravel of the compressed spring 200, thereby to urge the switch 101 into position temporarily to close circuit with the conductor 136'. Circuit is thereby completed from the positive side of the line 140, via the positive conductor 144, through the switch 99, the windings of the armatures 138 and 137 to the switch 101 aforesaid, and on through the conductor 136' to the purge timer motor 132' of the purge timer 155 and back through the negative side conductors 143', 143, and 141 to the negative side of the battery 142.

The purge timer motor may now rotate the purge timer needle 133' onto the purge timer cam 135' whereby circuit is completed therethrough from the positive conductor 134' by way of the conductor 131' through the switch 102 and the conductor 146 and the windings of the solenoid valve 103 through the common return conductor 147 to the negative side of the battery 142. At the same time circuit is completed through the by-pass conductor 102' and the conductor 136' through the motor 132' back through the return conductors 143', 143, and 141 to the negative side of the battery 142. The motor 132' may now rotate the needle 133' and circuit through the purge timer system will be maintained until the predetermined purge timer cycle is completed.

The solvent now may flow from the solvent conduit 43 and through the metering valve 104 and through the solenoid valve 103 and down the solvent conduit 43 to the conduit 39' in the casing 49' to flush out the passages through which the paint and catalyst previously flowed. Beforehand the valve 105 has been manually closed through which solvent may be by-passed over the conduit 106 by manual election to purge the blender 84 and metering pumps 82 and 81. The solvent now flows through the passages through which the admixture of paint and catalyst has passed to the spray head, the solvent then to be returned, as will be hereinbelow explained.

As it is highly undesirable for the solvent to flow out of the spray head where it may dissolve the paint which has been sprayed on the holiday surfaces of the pipe, means is provided to avoid this, as best shown in FIG. 4. Such means comprises a suction manifold 107 to slide on the shaft 11 and over the spray head 56' having clutch flanges 108, 108' forwardly thereon to receive a clutch pin 109 therebetween, such clutch pin 109 extending inwardly between the clutch flanges from a clutch ring 110 surrounding the clutch flanges and the shaft 11. A solenoid 111 is mounted on the shaft 11 forwardly of the clutch and just rearwardly of the rearward spacer ring 61 just to the rear of the rearward Guiberson cup 62. This solenoid is shown in FIG. 3 as having conductors 112 and 113 extending thereto from the paint timer so that paint timer actuation closes circuit thereto. Upon actuation the solenoid ram 114 pulls the ring 110 forwardly as the top of the ring 110 pivots on a pin 115 supported from the top of the solenoid 111. This moves the manifold suction ring 107 forwardly to open spray head 56'.

Upon de-energization of the solenoid 111 at the end of the paint timer cycle a compressed spring 124, mounted between the clutch ring 110 and a neck supported bracket 125 forwardly thereof, may expand to urge the clutch rearwardly and the manifold ring into spray head closing position. The solvent which now courses through the conduit 52 and the spray head nozzles 58 to flush the system of paint, as epoxy, may then be picked up by a suction line 116, flexible as indicated by the loop 117, and under suction of a pump 122, to be hereinafter described, and drawn forwardly through a return conduit 118 back through the shaft 11 and casing 49' to be discharged outside of the pipe through a discharge conduit 119 into a solvent reservoir 120. Here the solvent may be settled, the refuse drained off through a drain valve 121, and the cleared solvent returned by the suction pump 122 which draws off the cleared solvent from the top to deliver it to the solvent reservoir 25.

Figure 5:
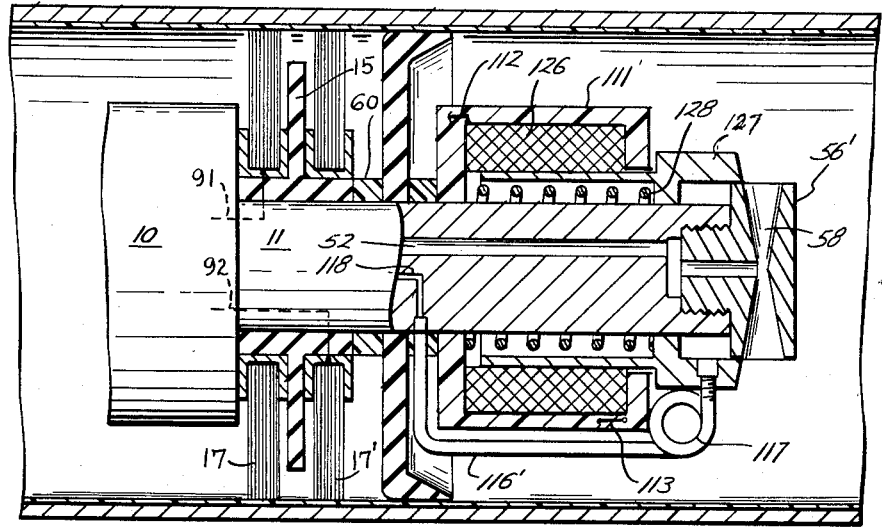
FIG. 5 is a sectional view showing another form of detection, spray and purge apparatus.

An optional structure for catching the solvent is shown in FIG. 5 whereby a solenoid 111' has windings 126 connected by conductor 112, 113 to the paint timer conductor circuit 112, 113 shown in FIG. 3. Within the windings 126 an armature 127 is provided having its rearward end of diameter to cover the spray head 56', including the spray nozzles 58. The armature 127 houses a spring 128 which bears forwardly against the forward end of the solenoid 111' and rearwardly against an inwardly extending flange of the armature 127. Upon circuit actuation at the beginning of spraying the armature 127 is drawn forwardly as shown in FIG. 5 to uncover the spray head nozzles. Thereafter at the end of paint timer cycle the circuit 112, 113 is broken and the compressed spring 128 moves the armature rearwardly to cover the spray head nozzles. A suction pump 122, as hereinabove described, takes suction centrally from the spray nozzles during closure thereof, and draws the solvent forwardly through a flexible line 116', as indicated by the loop 117, to the shaft 11 and through a return conduit 118 to such a reservoir and settling system as shown in FIG. 3. From thence the suction pump 122 discharges it to the reservoir 25.

The purge timer motor 132' rotates the purge timer needle 133 onto the cam 135' at the beginning of the purge timer cycle while the temporary closure of the switch 101 is promptly interrupted. Closure has thus followed the overtravel of the armature 138 carrying the switch 101 to its most rightward position A. This movement to switch closing position has thus resulted, after the windings of relay 138 have been energized at the end of the paint timer cycle, due to the force of the released expansion of the strong spring 200. Stabilization then occurs to open the switch 101 again as the spring 201 returns the armature 138 back past the point B which would define its normal length prior to contraction under force, to a position where it may be re-latched when armature 137 descends.

During the remainder of the purge timer cycle current continues through the conductor 144, the switch 99, the windings of the armature 138, and the conductors 145, 143 and 141 back to the negative side of the battery 142, and the spring 201 holds the armature 138 in position to be latched. However, since the windings of the latching armature 137 remain unenergized, the armatures 137 and 138 cannot be latched together during the solvent circulation or purge cycle.

At the end of the purge timer cycle the purge timer needle passes off of the purge timer cam 135' to break current to the solvent solenoid valve 103, and to break current through the purge timer motor 132' thereby to stop the motor 132' and the valve 103 closes. Pending further detector action the only circuit remaining energized in the apparatus is the circuit from the positive line 140 through the conductor 144, the switch 99, the windings of the armature 137, and the conductors 145, 143 and 141 back to the negative side of the battery 142. This maintains the armatures 137 and 138 latched together to prevent the solvent being turned on inadvertently.

In the event it may be desired to flush or purge or blow out the system with a gas, as compressed air or methane, the switch 102 is manually switched from the conductor 146 to the conductor 149 and the purge time cycle will operate the same with the exception that it will open and close the solenoid operated valve 123 instead of the solenoid valve operated valve 103.

The paint timers and purge timers are shown diagrammatically in FIG. 3 to be operated by direct current. Obviously an inverter power pack may be provided to convert the timers to operate by supplying 110 or 115 volt alternating current to the electronic timers to obviate having to rewire the timers to operate on a lower voltage direct current. However it is recognized that considerable economy can be achieved by changing these timers to operate on low voltage direct current, as by substituting transistors for tubes.

The timers indicated diagrammatically can be of the type for use in photographic dark rooms for the purpose of timing the exposure on photographic enlargers and printers, provided with a remote control switch input circuit, such timers also having relays and component parts inside the timers replaced with shock and vibration resistant components to condition them for use in apparatus for the internal coating of pipeline surfaces.

As has been shown herein, the apparatus demonstrates that it would be impossible to operate after detecting a holiday without such detection being followed by a paint spraying cycle of predetermined length. Also, as shown, a purge time cycle of predetermined length must follow any spray cycle which is not immediately renewed by detection coextensive with the end of a preceding spray time cycle.

It is also possible to assure that there is a definite spray cycle following any last instant of detection by connecting a relay in the paint timer in parallel with the relay 93 to de-clutch the paint timer motor 132 from the needle 133 so that the needle may be automatically spring returned to initial starting point then to be released from the returning means at such initial starting point and reengaged by the motor to start over a new time cycle. Patent No.

2,956,489 to William H. Carter, Jr., due to issue on October 18, 1960, for Cinephotomicrograph, shows a disclosure of a structure adapted to carry out this principle as applied to time lapse photography.

The timers are shown diagrammatically, each having a motor driven needle and a cam. However it is well known that there are many timer structures and many ways to predetermine the length of any time cycle, as by changing the duration or rate of motor rotation, or by changing the length of the cam or the equivalent length corresponding with the distance to be traversed. For instance as shown the time cams could be inter-telescoping as indicated diagrammatically by a radial line on each timer cam.

The means and structures and various equipment for carrying out the purposes of the invention are susceptible of considerable variations. For instance the pressurized gas which forces delivery of the paint, catalyst and solvent is not limited to nitrogen, nor is it essential that these be delivered by any specific pneumatic, hydraulic, or mechanical system. Also the blow-out or atomizing gas employed need not be limited to nitrogen or compressed air but, where a pipeline is being treated which is filled with methane, the latter may be used from a pressurized source such as source 38, FIG. 1. However, nitrogen or such non-combustible gas is preferred where oxygen is present in the pipeline. Paints other than epoxy resin base paints may be employed along with different solvents than the methyl ethyl ketone above noted. In connection with the timing cycle sequence, a suitable timing system which does not use the cam elements 133, 135 of FIG. 3 is an electronic photo timer such as motor TM5-R marketed by Lektra Laboratories Incorporated, 154 11th Avenue, New York 11. Furthermore, the means of detection of holidays is susceptible to considerable variation.

While the invention has been described in connection with several embodiments thereof, it is to be understood that further modifications may now suggest themselves to those skilled in the art and it is intended to cover such modifications as fall within the scope of the appended claims.

What is claimed is:

1. Internal pipe holiday detection and paint spraying apparatus adapted to be drawn through a pipe to be processed, said device including successively in the direction of travel, a universal connection member, a frame shaft universally connected thereto, a flexible cup mounted on said shaft with base forwardly and side walls bearing sealably against the inner surface of the pipe, a valve case mounted on said frame shaft, paint solvent, and inert gas supply conduits extending from the pipe exterior sealably through said cup and into said valve case, a pair of wire brushes insulatively mounted on said shaft and having insulator means spacing said brushes apart, a spark baffle mounted on said shaft aft of said brushes and sealably bearing against the inner surface of the pipe, and a spray head at the after end of said shaft, there being provided from said valve case a common conduit for alternate delivery of paint and flushing solvent through said spray head to paint and then to flush said common conduit including said spray head, and a separate conduit for inert gas delivery to said spray head for atomization of paint through said spray head, said valve case including a battery therein with a circuit extending to said brushes for current flow therein in the absence of insulative, corrosion resistant paint on the inner pipe surface between said brushes, a detector in said circuit actuated in response to said current flow, a first valve means in said valve case alternately to place said paint conduit and then said inert gas supply conduit in communication with said common and inert gas delivery conduits and a second valve means downstream therefrom alternately to open and close said common and inert gas delivery conduits, a timer in said valve case operable upon actuation of said detector to actuate said first and second valve means for simultaneous paint and inert gas delivery to said spray head for a first predetermined time interval and thereafter to actuate said first valve means for a second predetermined time interval to deliver solvent to flush said common conduit including said spray head and to close said valve means at the end of said second time interval.

2. Internal pipe holiday detection and spraying apparatus adapted to be drawn through a pipe to be processed for holiday elimination and including spaced apart forward and rearward sealing means bearing sealably against the pipe to seal off the space therein between, conduit means including means to deliver paint through said forward sealing means and rearwardly of said rearward sealing means for subsequent atomized spraying, and thereafter to deliver flushing solvent through said forwarding means and through said conduit means rearwardly of said rearward sealing means to flush said conduit means, between said sealing means adapted to render an impulse upon the detection of an internal pipe area unprotected by insulative, corrosion resistant paint, control means actuated upon said impulse and including a timer set operative to run after said impulse over a time cycle sequence, selector means cooperative with said timer means and actuated by said impulse to select paint delivery to the detected area after said impulse for a first time cycle and thereafter operative at the beginning of a second time cycle to select solvent delivery for flushing said timer means including means cooperative with said control means at the end of said second time cycle to shut off said timer and close off said control means against paint or solvent flow therethrough.

3. Apparatus for internal pipe surface holiday detection and elimination thereafter by coating completion which comprises a pipeline machine including spaced apart forward and rearward sealing means bearing sealably against the pipe to seal off the space thereinbetween, conduit means to deliver paint and solvent successively through said forward sealing means and said second sealing means, detector means between said sealing means to detect an exposed area in the pipe inspected and to deliver a responsive impulse, control means including a timer and selector means connected to said detector means both actuated by said impulse and thereafter, respectively, first to set operative said timer for a sequence of time cycles and to select paint to be delivered through said control means for a first time cycle of said sequence and thereafter to select flushing solvent to be delivered through said control means for the second time cycle of said sequence, said timer being operative at the end of said first time cycle to continue said second time cycle and being operable thereafter to terminate said second time cycle to close said control means.

4. Internal pipe holiday detection and spraying apparatus adapted to be moved through a pipe to be processed for holiday elimination and including conduit means including means to deliver paint through said apparatus for subsequent atomized spraying and thereafter to deliver solvent through said apparatus, detector means adapted to render an impulse upon the detection of an internal pipe area holiday unprotected by insulative, corrosion resistant paint, control means actuated upon said impulse and including a timer set operative to run after said impulse over a time cycle sequence, selector means cooperative with said timer means and actuated by said impulse to select paint delivery to the detected area after said impulse for a first time cycle and thereafter operative to select solvent delivery to flush said conduit means for a second time cycle, said timer means including means cooperative with said control means at the end of said second time cycle to shut off said timer and close off said control means against paint or solvent flow therethrough.

5. Apparatus for internal pipe surface holiday detection and elimination thereafter by coating completion which comprises a pipeline machine which includes means to deliver paint to holiday areas and means to deliver flushing solvent to flush said delivery means, detector means to detect the occurrence of holiday areas in the pipe traversed by said machine and to deliver a responsive impulse, control means including a timer and selector means connected to said detector means both actuated by said impulse and thereafter, respectively, to set operative said timer for a sequence of time cycles and to select paint to be delivered through said control means for a first time cycle of said sequence and thereafter to select flushing solvent to be delivered through said control means for the second time cycle of said sequence, said timer being operative at the end of said first time cycle to continue said second time cycle and being operable thereafter to terminate said second time cycle to close said control means.

6. Pipe protector apparatus including apparatus to detect the presence of unprotected areas, spots, pits and the like upon internal surfaces of pipe including a detector to impart a signal upon such detection, means, including a spray head, to supply a paint of blended resin and catalyst at a controlled rate to said apparatus to spray the paint upon the areas of detection, a paint spray timer actuated by said detector to admit paint to be sprayed for a predetermined time interval thereafter, means to apply and return a purging medium through said system to cleanse the paint residue therefrom, means actuated by said paint spray timer at the end of said time interval to close said spray head, a purge timer actuated by said paint spray timer at the end of said time interval to admit said purging medium into and from said apparatus for a cleaning interval thereafter and then to close said means applying said purging medium.

7. Apparatus to detect and coat uncoated internal pipe surface areas comprising a detector to impart a signal upon detecting such areas, spray means including a timer and spray head to supply a protective coating through said apparatus and spray head to such detected areas for a predetermined time interval as actuated by said detector, purging means including a purge timer to admit and return a purging medium through said apparatus at the end of said time interval for a predetermined purging time cycle, and occluding means actuated at the end of said time interval to cover said spray head when spraying is discontinued.

8. Apparatus to detecct and coat uncoated internal pipe surface areas comprising a detector to impart a signal upon detecting such areas, spray means operative by said detector to supply a protective coating through said apparatus to such detected areas for a predetermined time interval, purging means operative by said spray means to convert said apparatus into a closed system and to circulate a purging medium therethrough after said time interval for a predetermined purge time interval.

9. Apparatus claimed in claim 7 in which said occluding means comprises a suction manifold to cover said spray head, clutch means connected thereto, a solenoid on said apparatus and actuated by said timer at the beginning of said time interval to act upon said clutch means to withdraw said suction manifold from spray head occluding position, purging medium return means connected to said suction manifold, and resilient means connecting said apparatus to said clutch means and operative upon de-energization of said solenoid at the end of said time interval to move said suction manifold into spray head occluding position.

10. Apparatus as claimed in claim 7, in which said occluding means comprises a solenoid including a housing mounted on said apparatus, an armature therewithin including means to uncover said spray head when said solenoid is energized at the beginning of said time interval, purging medium return means connected to said armature to communicate with the interior of said spray head when said armature occludes said spray head, and resilient means within said armature to urge it to spray head occluding position when said solenoid is de-energized at the end of said time interval.

11. Apparatus as claimed in claim 7 in which said occluding means includes a solenoid mounted on said apparatus including means normally to cover said spray head and retractable means actuated by said spray timer to uncover said spray head at the beginning of said time interval, resilient means to return said cover means to occlude said spray head at the end of a spray time cycle, and means connected to said cover means to return said purging medium from said apparatus during said purging time cycle.

12. Apparatus as claimed in claim 8 in which said purging medium comprises a solvent.

13. Apparatus as claimed in claim 8 in which said purging medium comprises a gas.

14. Apparatus as claimed in claim 8 which includes means to alternately admit a solvent or a gas as the purging medium.

References Cited in the file of this patent

UNITED STATES PATENTS 739,788   Morcom et al. _____ Sept. 22, 1903